July 4, 1950 J. A. BRADLEY 2,513,279
REMOTE DETECTION AND CONTROL SYSTEM
Filed June 12, 1943 9 Sheets-Sheet 1

INVENTOR.
James A. Bradley,
BY
John B. Brady
ATTORNEY

July 4, 1950 J. A. BRADLEY 2,513,279
REMOTE DETECTION AND CONTROL SYSTEM
Filed June 12, 1943 9 Sheets-Sheet 2

INVENTOR.
James A. Bradley.
BY
John B. Brady
ATTORNEY

July 4, 1950          J. A. BRADLEY          2,513,279
REMOTE DETECTION AND CONTROL SYSTEM
Filed June 12, 1943                             9 Sheets-Sheet 3

INVENTOR.
James A. Bradley,
BY
John B. Brady
ATTORNEY

July 4, 1950  J. A. BRADLEY  2,513,279
REMOTE DETECTION AND CONTROL SYSTEM
Filed June 12, 1943  9 Sheets-Sheet 6

INVENTOR
James A. Bradley,
BY
John B. Brady
ATTORNEY

July 4, 1950  J. A. BRADLEY  2,513,279
REMOTE DETECTION AND CONTROL SYSTEM
Filed June 12, 1943  9 Sheets-Sheet 8

INVENTOR.
James A. Bradley,
BY
John B. Brady
ATTORNEY

Patented July 4, 1950

2,513,279

UNITED STATES PATENT OFFICE 2,513,279

REMOTE DETECTION AND CONTROL SYSTEM

James Albert Bradley, St. Petersburg, Fla.

Application June 12, 1943, Serial No. 490,648

7 Claims. (Cl. 343—7)

My invention relates broadly to remote detection and control systems and more particularly to a precision control system for remotely positioned bodies utilizing principles of reflection of controlling energy.

This application is a continuation-in-part of my application Serial No. 360,162, filed October 7, 1940, for Remote Detection and Control System, Patent No. 2,399,426, granted April 30, 1946.

One of the objects of my invention is to provide a remote detection and control system operative for precision control of a destructive weapon by energy reflected from a remotely positioned body.

Another object of my invention is to provide an arrangement of energy transmission and reception apparatus by which the distance of a remote body from a predetermined position may be accurately determined.

Still another object of my invention is to provide a method and apparatus for controlling the aiming of destructive weapons against a remote target in which both the horizontal and vertical position of the target determine the aiming of the destructive weapon for thereby increasing the accuracy of control of the aiming mechanism.

A further object of my invention is to provide a protective system operative upon principles of reflection of energy in which the amplitude of the energy utilized in the protective system is controlled in accordance with barometric or atmospheric conditions existing in the area to be protected for thereby restricting the energy required in accordance with existing weather conditions.

A still further object of my invention is to provide a protective system in which a destructive weapon is automatically discharged after having been accurately aimed under control of reflected energy from a remote target and in which the emitter of energy is caused to initiate a searching operation upon cessation of a succession of discharging operations for repeating a protective cycle.

Another object of my invention is to provide means for controlling the discharge of a destructive weapon upon reflection of energy from a remote target at the instant that both horizontal and vertical energy responsive means receive maximum amplitude of reflected signal simultaneously along both a vertical and horizontal axis from the remote target.

Still another object of my invention is to provide means for controlling the emission of energy on axes displaced normal to each other for searching a predetermined area for remote bodies in coaction with responsive means operative along similarly disposed axes for the precision control of responsive apparatus by energy reflected from the remote body.

Other and further objects of my invention reside in an improved system of remote detection and control as set forth more fully in the specification hereinafter following by reference to the accompanying drawings, in which:

Fig. 6 schematically shows the application of the system of my invention to torpedo discharge tubes aboard ship for automatically aiming the torpedo at an objective such as a submarine under control of reflected forces emanating from the ship and intercepted by the submarine; Fig. 10 schematically shows the application of my invention to torpedoes guided under control of a reflected force reflected from a remote target or objective to which the torpedo is automatically steered as a destructive weapon.

13; Fig. 20 is a trigonometric diagram showing the manner in which the distance from the approaching mobile body to a fixed station is computed.

Figure 1:
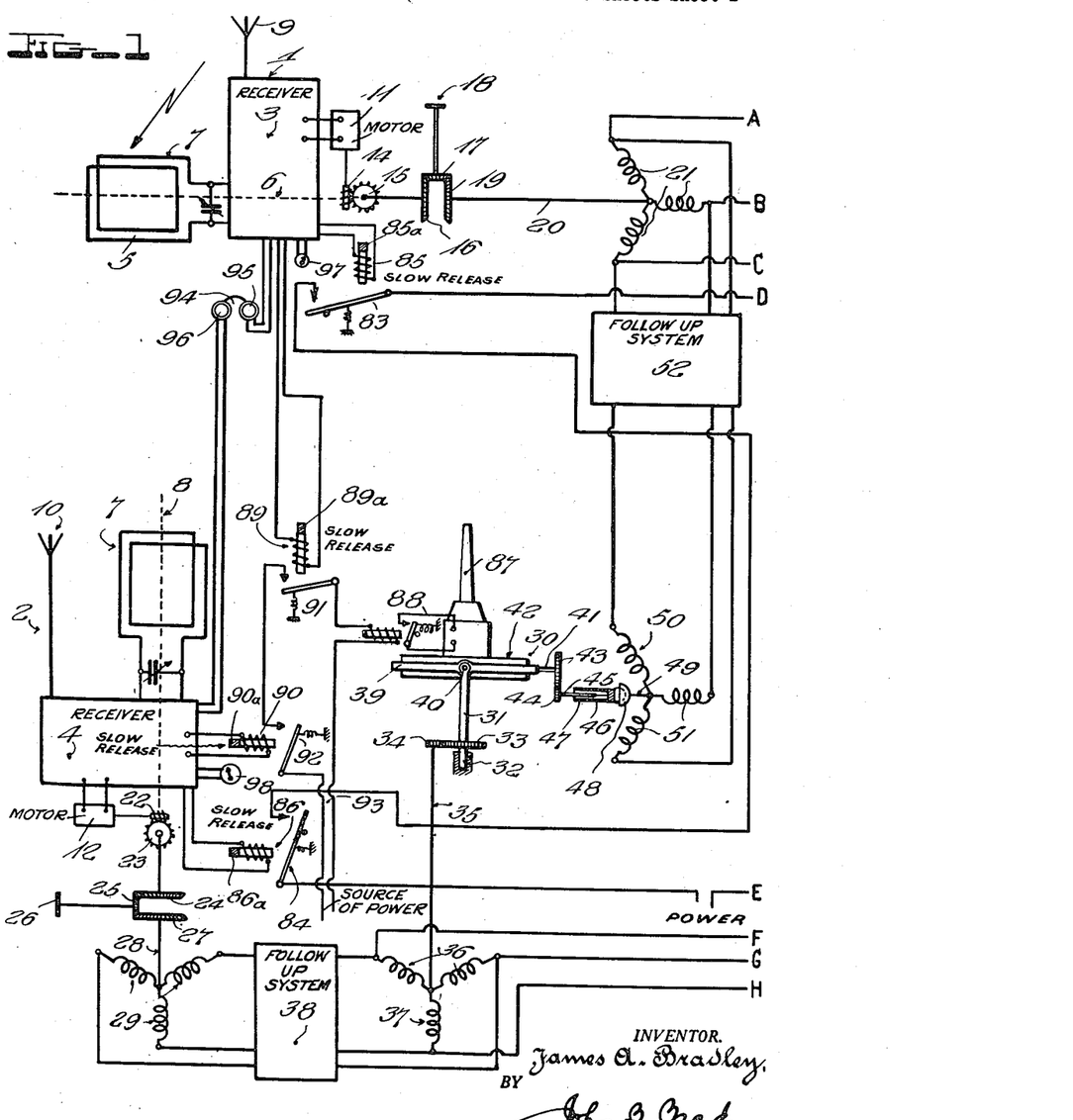
Figures 1 and 2 taken conjointly illustrate one embodiment of the energy transmission and reception system of my invention.

Referring to the drawings in detail, I have schematically shown a receiving system in Fig. 1 and the coacting transmission system located at a proper position with respect to the receiving station. The receiving station comprises two independent receiving channels designated generally at 1 and 2, each of which include a directional radio receiver shown at 3 and 4. The directional radio receiver 3 is connected to loop antenna 5 which is rotatably mounted for movement about a horizontal axis designated at 6. Directional loop antenna 7 of the directional receiving channel 2 is mounted for rotation about a vertical axis designated at 8. The directional receiving apparatus of each receiving channel is of the self-orienting type employing the principles set forth, for example, in Frederick J. Hooven Patent 2,173,841, of September 26, 1939, wherein the directional loop antenna is automatically moved to a position proportional to the direction from which the signal incident upon the loop is received. The intensity of the received signalling energy effective to control mechanism in the output circuit of the receiving apparatus is proportional to the degree of deviation of the plane of each loop from a line extending in the direction of the source of reflected energy. Each directional receiving channel includes a non-directional receiving antenna designated at 9 and 10, the effects of which are combined with the self-orientable loops 5 and 7, respectively, for directionally controlling the activation of the driving motor 11 in the case of signalling channel 1, and 12 in the case of signalling channel 2. The driving motors 11 and 12 control the angular movement of the loops 5 and 7, respectively, which automatically hunt about a minimum signal when signalling energy is incident upon the horizontal and vertical loops. Driving motor 11 drives worm 14 which is engaged with gear 15 on shaft 6. Shaft 6 is extended to the adjustable bevel gear system 16 which is capable of manual angular adjustment and resetting through gear 17 controlled by hand wheel 18. Thus correction can be made between the driving means and the driven means operated by the automatic system, or the driven means may be manually adjusted in the event that the automatic orientation feature is not desired. The bevel gear 19 which is driven by bevel gear 16 through bevel gear 17 connects through shaft 20 to a structure which controls actuating windings 21 of a "Selsyn" generator. The "Selsyn" generator thus generates energy in proportion to the direction of orientation of the horizontally rotatable loop 5. The loop antenna 5 orients about a horizontal axis and receives energy in a horizontal plane of polarization.

The loop antenna 7 orients about a vertical axis and receives energy incident thereon in a vertical plane of polarization. The driving motor 12 in the directional receiving station 2 that controls the angular movement of loop 7, hunts about a minimum and drives worm 22 which engages gear 23 on vertical shaft 8 which connects to the orientable loop 7. Shaft 8 is extended to the adjustable bevel gear system 24 which is capable of manual angular adjustment through gear 25 controlled by hand wheel 26. Thus the driven system controlled by the self-orientable loop 7 may be manually adjusted in the event that the automatic orientation feature is not desired or in the event that correction must be made in the angular relation of the driving shaft 8 and the driven mechanism. The bevel gear system 27 which is driven from bevel gear system 24 connects with the apparatus to be driven. In this instance the bevel gear 27 drives shaft 28 which connects with a structure controlling the position of actuating windings 29 of a "Selsyn" generator. The "Selsyn" generator 29 thus generates energy in proportion to the direction of orientation of the vertically rotatable loop 7.

Figures 16, 17:
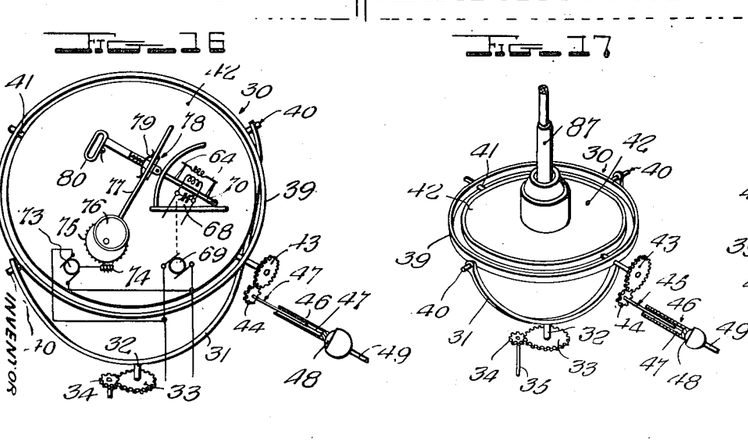
Fig. 16 schematically shows an arrangement for mounting a radio beam transmitting system which is oriented through two dimensions for directing the radio beam in the desired direction.
Fig. 17 shows the arrangement of an anti-aircraft gun or weapon for orientation in two angular directions for aiming the gun in accordance with the principles of my invention toward an objective.
Figure 18:
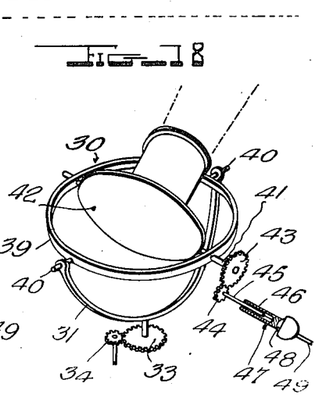
Fig. 18 shows an arrangement of searchlight on a carrier wherein the light is arranged to be shifted in either of two different directions under control of a reflected force in accordance with the principles of my invention.

I provide a carriage structure or mount that is angularly adjustable in either of two planes normal to each other and which may support a variety of different mechanisms such as an anti-aircraft gun as illustrated in Figs. 1 and 17; a radio frequency energy beam emitter as illustrated in Fig. 16; a searchlight as illustrated in Fig. 18; or other form of energy transmission device. I have shown the carriage or mount schematically at 30 in Fig. 1 comprising yoke member 31 which is journalled for rotation about a vertical axis through shaft 32 carrying gear 33. Gear 33 is driven by gear 34 carried by shaft 35 actuated by the rotor windings 36 of the "Selsyn" motor designated at 37 which is operated through the synchronous follow-up system 38 controlled by "Selsyn" generator windings 29.

Yoke 31 forms a horizontal pivotal mounting means for angularly shiftable ring frame 39. The pivotal connections between the ends of yoke 31 and the ring frame 39 are represented at 40. The ring frame 39 provides a journalling means for the horizontally extending shaft 41 which extends in a diametrical plane passing through the pivotal connections 40. The shaft 41 connects with a platform support 42 forming a mount for a variety of different devices represented more clearly in Figs. 16, 17 and 18. Shaft 41 is driven by gear 43 from gear 44 through shaft 45. Shaft 45 includes an adjustable coupling link 46 which allows adequate lost motion while maintaining precision control required in the system of my invention. The coupling 46 includes a sleeve member 47 which receives the shaft 45 in telescopic arrangement. Both shaft 45 and sleeve 47 are keyed together to represent the transfer of a rotary driving force while shaft 45 and sleeve 47 are free to shift axially. The end of sleeve 47 terminates in a universal joint 48, the driven member of which is operated by shaft 49 from the "Selsyn" motor structure 50. The "Selsyn" motor structure 50 includes windings 51 which are connected through synchronous follow-up system 52 to the "Selsyn" generator windings 21. Thus driving components for operating the carriage or mount 30 are derived proportionally from the vertical and horizontal energy components received by horizontally disposed loop 5 and vertically disposed loop 7. The equipment thus far described is all located at the energy receiving station. Parallel circuit connections extend from the "Selsyn" motor windings 21 and 36 through conductors that I have designated A, B, C and F, G, H to similar motor windings 53 and 54 located at a proper transmitting station. The lettered conductors which extend from motor windings 21 and 36 in Fig. 1 connect with correspondingly lettered conductors shown in Fig. 2. The motor windings 53, through clutch 99 and reduction gear 99' drive gear 56 which meshes with gear 57 for imparting driving movement to horizontal shaft 58. Horizontal shaft 58 controls the vertical angular movement of platform 59 in substantially the same manner that platform 42 illustrated in Figs. 16, 17 and 18 is controlled. The horizontal movement of platform 59 is controlled through shaft 60 coupled to a suitable yoke and pivotally connected with platform 59 as fully disclosed in Figs. 16, 17 and 18. Gear 61 carried by shaft 60 is driven by gear 62 operated through shaft 63 from "Selsyn" motor windings 54 through clutch 100 and reduction gear 100'. The adjustable platform 59 provides a mounting means for a high frequency beam transmission device. The beam transmission device is illustrated diagrammatically as consisting of an ultra-high frequency doublet radiator 64 including exciting winding 65 which is coupled through winding 66 with a source of high frequency energy connected to conductors 67. The transmission circuit is cyclically tuned through a predetermined frequency band by any suitable means such as rotary condenser 68 driven by motor 69. The cyclic operation of the transmission system over a band of frequencies enables various receiving systems of the type shown in Fig. 1, tuned to selected frequencies within the transmission band of frequencies, to be located in various geographical positions in the area to be protected for increasing the protection afforded by the system of my invention. Because of the ability of variously shaped bodies to variously reflect energy directed against such bodies at different frequencies the wide distribution of receiving stations adjusted to differing frequencies for response to the various frequencies transmitted in the band of transmission frequencies increases the protection afforded over a wide geographical area. The high frequency radiator 64 is suitably mounted with respect to the reflecting surface 70 by means of insulators 71. The reflecting surface 70 is pivoted to the mount or carriage such as 59 in the position illustrated at 72. For purposes of schematically showing the parts of the mechanism, the mechanism for shifting the emitter for effecting a beam sweep of the area adjacent the area to be protected, I have shown the parts of the control mechanism substantially in side elevation superimposed upon the platform 59. In the actual installation it will be understood that the beam emitter is mounted on the carriage or platform 59 for the upward projection of the ultra-high frequency energy into the area through which aircraft fly. The mechanism for causing the periodic sweep of the area to be protected by the ultra-high frequency beam is driven by a motor 73 through worm 74. Worm 74 meshes with gear 75 which drives the eccentric 76 which in turn imparts substantially reciprocative movement to member 77. Member 77 may be gripped between plate member 78 and spring member 79 under control of hand grip lever device 80 and provide connecting means through pivot 81 with the upper end of reflector 70 so that reflector 70 may be angularly driven through recurring cycles for emitting a beam of energy that sweeps the area to be protected. The hand grip 80 is provided with a clutch operating mechanism by which the gripping means 78 and 79 may be rendered ineffective so far as driving means 77 is concerned to permit the manual adjustment of the emitter 64 and reflector 70 to any desired angular position. In this way the periodic sweep of the beam may be interrupted and the angle of the beam with respect to the surface of the earth may be subjected to manual adjustment. By releasing the manually controlled clutch the operation of the beam may be restored to the automatic control of the mechanism which I have described. The frequency changing means driven by motor 69 and the angular emission means driven by motor 73 are each controlled by a relay shown at 82. The operating winding of relay 82 connects through conductors D—E to the contact control circuits 83 and 84 of relays 85 and 86 of the horizontal and vertical component receiving systems, respectively. The relay systems 85 and 86 are activated by the horizontal component radio receiver 3 and the vertical component radio receiver 4 when reflected energy emitted from emitter 64 and reflected from an intervening body such as aircraft 174 is incidental upon horizontally polarized loop 5 and vertically polarized loop 7. Accordingly when a reflection of energy from the intervening body such as aircraft 174 does occur, this has the effect of arresting both the change in frequency on the transmitter by shutting down motor 69 and the sweep of the beam by shutting down motor 73 upon the opening of the circuits through the relay tongues and contacts of the contact control circuits 83 and 84 of relays 85 and 86. The relays 85 and 86 are of the slow release type so that for a predetermined time period after the passage of the intervening body the emitter will continue to emit a beam of energy at the selected angle to the earth's surface at which the antenna operating device was arrested and at the frequency at which the transmitter was operating at the time the intervening body caused the reflection of energy The slow release relays 85 and 86 each have eddy current slugs 85a and 86a on the heelpiece of the magnetic core structures which retard the collapse of the magnetic fields in the operating windings for a predetermined time after the deenergization of the relay windings.

Where the platform 42 carries a destructive weapon as represented in Figs. 1 and 17 at 87, I provide a fire control mechanism designated generally at 88. The fire control mechanism is initiated in action at the time a reflected signal is received by both the horizontally arranged loop 5 and vertically arranged loop 7. This combined action is secured by means of slow release relays 89 and 90 which have their contact systems 91 and 92 arranged in series with power source 93 and with the fire control mechanism 88. When the reflected signal energy is incident upon both loops 5 and 7, contact systems 91 and 92 close, thereby closing the circuit to fire control mechanism 88 initiating a repeating operation of the destructive weapon 87 which is trained into the path of movement of the intervening body. By precalculation, the destructive weapon 87 is trained on the path of movement of the intervening body sufficiently in advance of the intervening body to enable a direct hit to be made upon receipt of a reflected impulse from the intervening body through the signal receiving system. Correction is made for average speed conditions anticipated for the moving body in order to insure a hit by the destructive weapon. Relay 89 has a slug 89a while relay 90 has a slug 90a on the heel end of the respective core structures for insuring a slow release operation of the contact systems 91 and 92 in order to maintain the firing operation for a predetermined time after the first intervening body has triggered off the destructive weapon. In the case of waves of aircraft, the first aircraft of a group has the effect of triggering off the operation of the destructive weapon which will remain in operation for firing a destructive force across the path of succeeding aircraft for a given length of time. The passage of each succeeding aircraft in causing a reflection in effect maintains the firing circuit closed for an additional period of time. When the waves of aircraft have ceased, however, the firing of the destructive weapon 87 discontinues automatically.

To facilitate the operation of the signal receiving system under control of operation personnel, I provide a telephone circuit designated generally at 94 which includes a head-set in which the telephone 95 connects to the output of the directional receiver 3 and the telephone 96 connects to the output of signal receiver 4. An observer is thereby able to check the receipt of signals both by the horizontally arranged loop 5 as well as the vertically arranged loop 7 and make all necessary circuit adjustments accordingly. An indicating meter 97 connected with the output of directional receiver 3 and an indicating meter 98 connected with the output of directional receiver 4 further permits a visual observation of the operation of the two directional receiving systems for facilitating adjustment accordingly.

Figures 2, 2D:
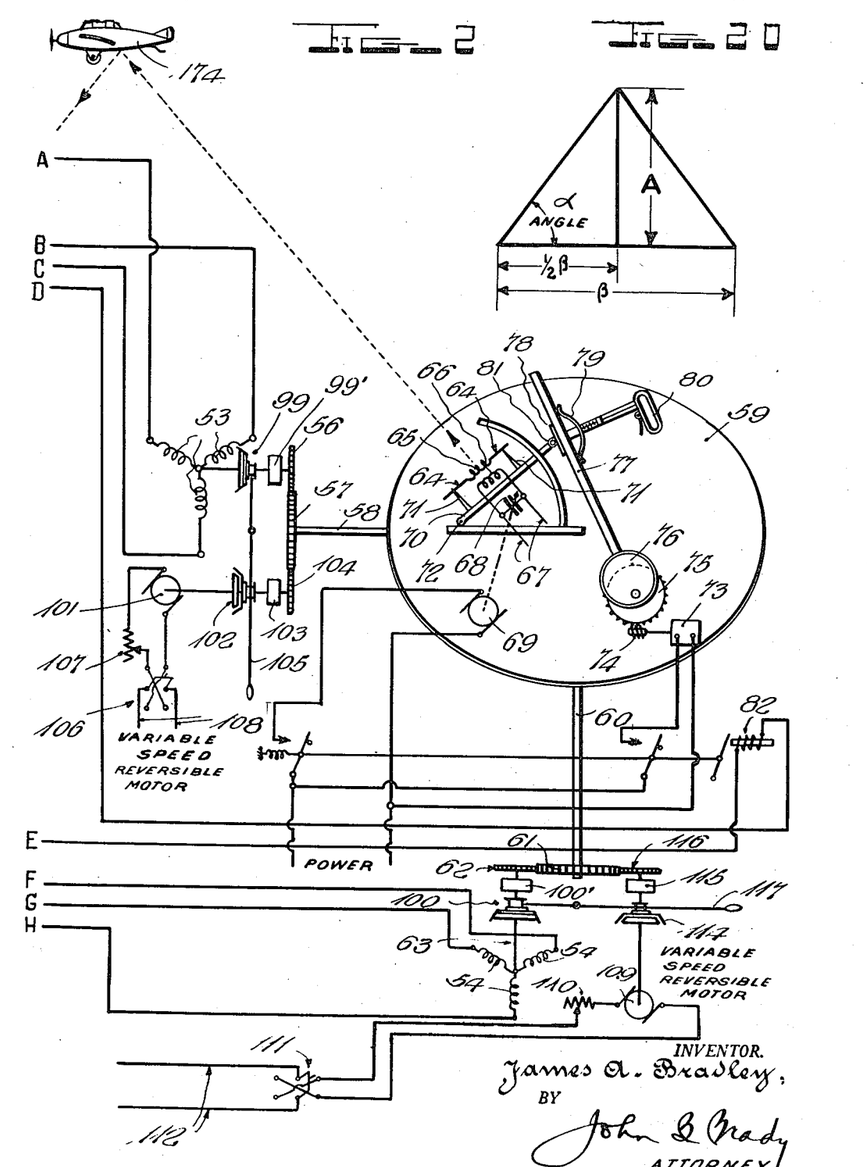

My invention contemplates in one form the substantial separation of the transmission station from the receiving station and the intercommunication between these locations by monitoring telephones for coordinating the activities of the crews in charge of the transmission beam with the activities of the crews in charge of both the radio receiving circuits and the ordnance equipment at the receiving station. There are times when correction must be made for the relative angular adjustments between the transmitting beam at the transmitting station and the ordnance equipment at the receiving station and for this purpose I provide clutch mechanism and speed reduction gear between the motor structure of "Selsyn" motor 53 and drive gear 56 as designated at 99 and 99', and clutch mechanism and speed reduction gear between the motor structure 54 of "Selsyn" motor 54 and drive gear 62 as represented at 100 and 100'. These clutch mechanisms enable the control of platform 59 to be taken away from the "Selsyn" generators at the receiving station and permit local control of the transmitting beam to be secured. Local control is established along a horizontal axis by means of the auxiliary variable speed reversible motor 101 connected through clutch mechanism 102 and reduction gear mechanism 103 to gear 104 which meshes with driving gear 57. A manual actuating lever 105 is provided which controls both clutches 99 and 102. The manual actuating lever 105 operates to disengage clutch 99 when clutch 102 is engaged. Similarly when clutch 99 is engaged clutch 102 is disengaged. Reversing switch 106 has been indicated schematically for reversing the direction of movement of auxiliary motor 101. Speed is controlled by suitable rheostat 107. The motor is connected to a suitable source of supply through leads 108.

Similarly the vertical component control of platform 59 is effected under control of auxiliary motor 109 whose speed may be varied through rheostat 110 and whose direction of rotation may be changed through suitable reversing switch 111 connected with a suitable power source through leads 112. The variable speed auxiliary motor 109 may be coupled through clutch 114 and through reduction gear 115 to gear 116 which meshes with gear 61 on vertical shaft 60. Manual actuating means 117 controls the disengagement of clutch 100 when clutch 114 is engaged and the disengagement of clutch 114 when clutch 100 is engaged. Thus it is possible to change the angular relation of the platform 59 to meet special conditions which may be necessary in coordinating the control between the transmitting and receiving stations.

Figure 3:
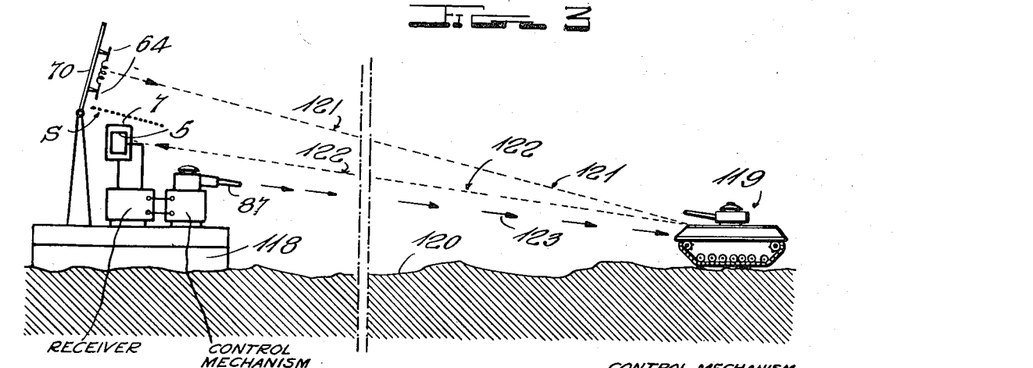
Fig. 3 schematically illustrates one of the applications of the remote detection and control system of my invention to the protection of geographical areas against attack by mobile bodies such as tanks.

The several variable conditions I have explained enable the system of my invention to be applied in various ways. In Fig. 3 I have shown a fortress 118 protected by the system of my invention against attack by mobile units such as tanks 119 approaching the fortress over the terrain indicated generally at 120. The transmitter for radiating the beam of energy is indicated generally at 64 adjacent the reflecting surface 70 which may be suitably changed in angular position as heretofore explained for sweeping a geographical area with a beam of energy indicated generally at 121. The intervening body constituted by tank or mobile unit 119 causes a reflection of the transmitted beam which I have indicated at 122, which energy is received by horizontally arranged loop 5 and vertically arranged loop 7 for orienting separate controls which produce corresponding movement of destructive weapon 87 as heretofore explained and effecting by operation thereof, initiated by the approaching hostile tank or mobile unit 119, a destructive force along the path designated at 123. Thus the hostile tank or mobile unit is destroyed by intercepting the propagated beam of energy in the approach to the fortress 118. Screen S is arranged to prevent any local interaction between transmitter 64 and the receiving loops 5 and 7.

Figure 4:
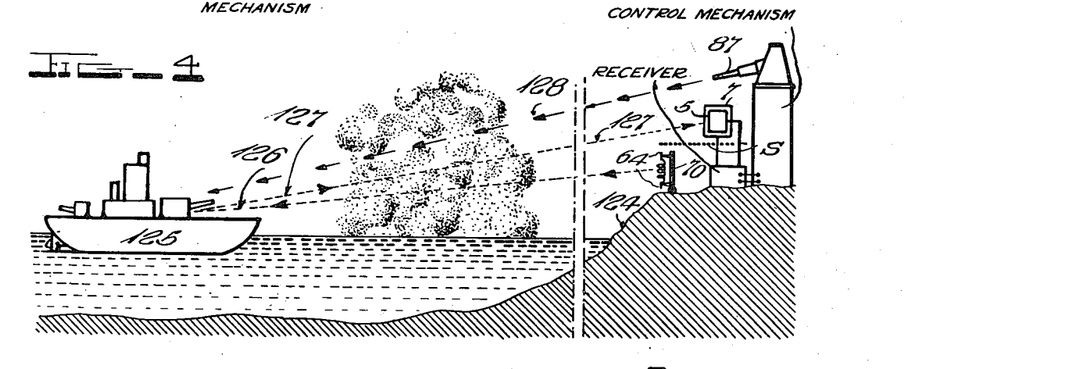
Fig. 4 schematically illustrates the application of my invention to coast defenses for the destruction of hostile war-craft approaching a coastline.

In Fig. 4 I have shown an installation for the protection of coastline defenses at 124 in which protection is offered against the approach of hostile watercraft designated generally at 125. The transmitter shown at 64 is arranged in association with reflector 70 and operates in accordance with the principles hereinbefore set forth in detail for transmitting energy along a beam 126 which sweeps a wide path. The intervening body such as battleship 125 causes a reflection of the energy along path 127 operating horizontally arranged loop 5 and vertically arranged loop 7 which initiate in motion the mechanism described in Fig. 1 causing automatic orientation and firing of destructive weapon 87 by which a destructive force is released along path 128 for the destruction of hostile craft 125. Thus the hostile craft in approaching the coastline intercepts the propagated beam of energy and by the reflection thereof initiates the release of a destructive force from the coastline upon the hostile craft. Screen S is arranged for preventing local interference between the transmitter 64 and the receiving loops 5 and 7.

Figure 5:
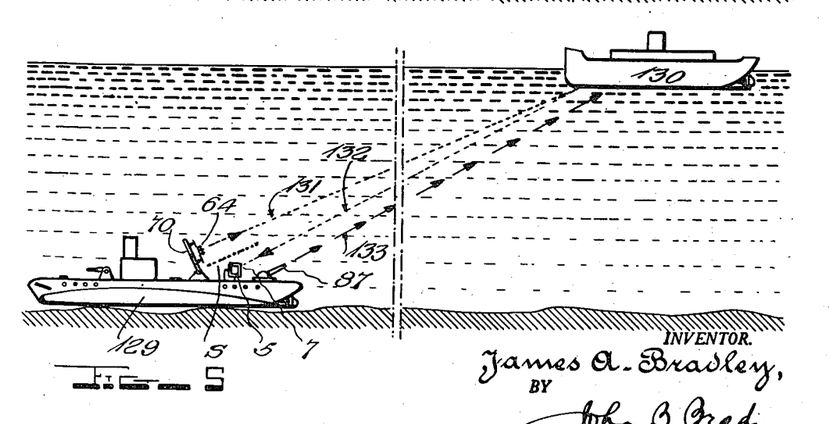
Fig. 5 shows an application of my invention in the offensive operation of submarines in warfare against hostile craft.

In Fig. 5 I have shown the manner in which a submarine 129 equipped with the system of my invention may destroy shipping represented at 130 with minimum exposure to self danger. In this arrangement the transmitter 64 is arranged with relation to reflector 70 to produce a sweeping beam of energy generally along the path represented at 131. This energy encounters the intervening body represented by the ship 130 which reflects the energy along the path 132 activating the horizontally arranged loop 5 and the vertically arranged loop 7. These energy components serve to orient and fire destructive weapon 87 as heretofore explained for delivering a destructive force along the path 133 for destroying ship 130. Suitable screen S is arranged to prevent local interference between the transmission beam 131 and the reflected energy along path 132.

In Fig. 6 I have shown the application of my invention to surface-craft 134 for effecting the automatic aiming and firing of torpedoes 135 against hostile submarines or other craft 136. The surface vessel 134 may be provided with a compartment that I have illustrated generally at 137 within which a movable carrier 137' which supports the torpedo tube 138 is associated. The movable carrier 137' provides a watertight connection with the hull of the vessel 134 while enabling the torpedo tube to be oriented in a particular direction for releasing the torpedo against the objective. The torpedo tube 138 is mounted in much the same manner as explained in connection with the orientable tables 42 in Figs. 16, 17 and 18. That is to say, yoke 31 is driven through gears 33 and 34 from "Selsyn" motor 37 under control of signal components received by vertical loop 7 while table member 42 is driven under control of gears 43 and 44 from "Selsyn" motor 50 under control of signal components received by horizontally arranged loop 5. The loops may be suitably supported above decks as represented at 139 and operate in a manner similar to the receiving system heretofore described.

The transmitter is also supported above decks as represented at 140 wherein the mounting means 141 enables the reflecting surface 70 to be angularly driven through the motor mechanism as explained in connection with Fig. 2 which includes driving motor 73, worm gear 74, gear 75, eccentric 76 and driving arm 77 connected as explained in association with Fig. 2 to the reflecting surface 70. The transmitter connected to primary winding 66 sweeps a predetermined frequency band under control of motor 69 which drives condenser 68 for changing the frequency at which the transmitter operates. The ultrahigh frequency energy is emitted in a beam along the path represented at 142. When the beam strikes an intervening body such as submarine 136, the energy is reflected along path 143 for activating loops 5 and 7 of the receiving system. The receiving system by control of motor systems 37 and 50, effect orientation, aiming and release of the torpedo by circuits as more fully disclosed in Figs. 1 and 2. The torpedo 135 is discharged under control of release or firing mechanism indicated at 138A along a path represented at 144 for destroying the submarine 136. Thus the submarine is destroyed automatically by intercepting the propagated energy when seeking to maneuver itself within striking range of the vessel 134. The screen S protects the loops 5—7 against the direct effects of the transmitter so that loops 5 and 7 are activated only by reflected energy. A multiplicity of receiving systems pretuned to different frequencies within the band of frequencies swept by the transmitter may be arranged aboard the ship for controlling corresponding torpedo discharge tubes upon receipt of reflected signals at the frequency emitted within the variable frequency range of the transmitter.

Figures 7, 8, 21:
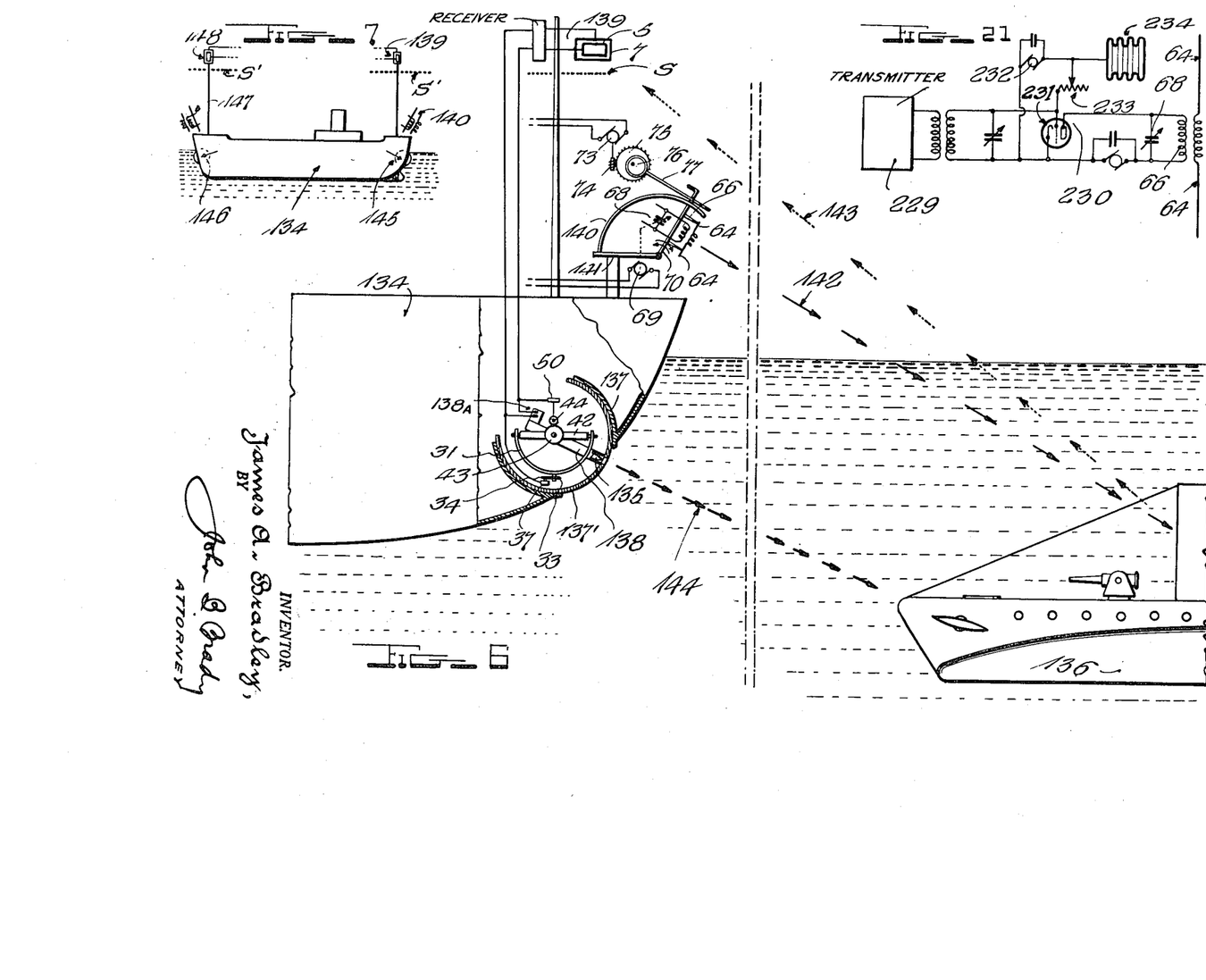
Fig. 7 shows the arrangement of the torpedo release mechanism both fore and aft of a vessel for automatically releasing torpedoes toward hostile craft in either direction.
Fig. 8 is a schematic view showing the apparatus of my invention mounted below the waterline in the hull of a vessel.
Fig. 21 is a schematic view showing one arrangement by which the range of the radio transmission system is regulated in accordance with weather conditions in the area to be protected for restricting the emitted energy to that necessary for effecting the remote detection and control for existing atmospheric, barometric or weather conditions.
Figure 8:
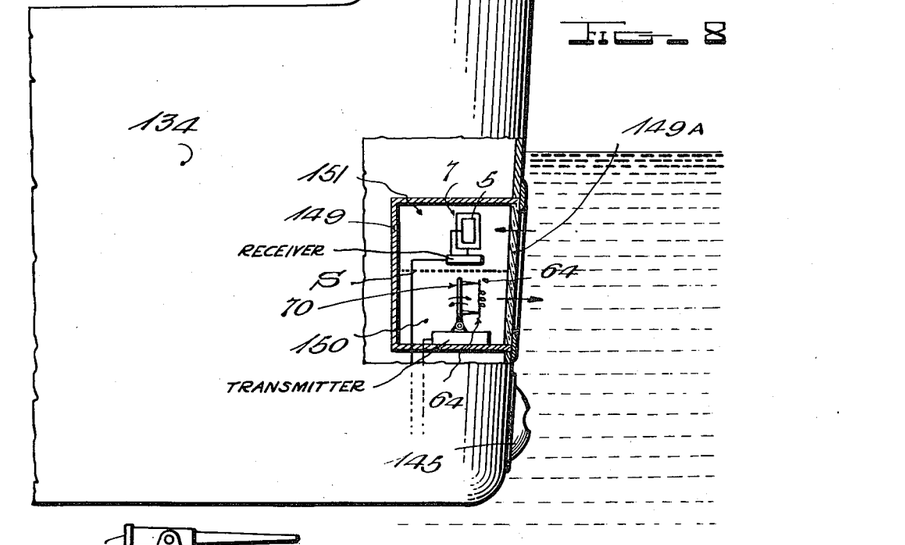

In Fig. 7 I have shown the application of the torpedo release tube both fore and aft of the vessel 134 in positions represented at 145 and 146. Separate transmission systems and receiving systems are associated with each of the torpedo discharge mechanisms 145 and 146. The transmitter 140 and the receiving system 139 are associated with the torpedo release apparatus 145 in a manner disclosed in Fig. 6, projection being made by screen S as heretofore explained for preventing direct interference between transmitter 140 and receiver 139. The torpedo release tube mechanism 146 is controlled by transmitter 147 and associated receiving system 148. Screening arrangement S' prevents direct interference between transmitting system 147 and receiving system 148. Provision is also made for screening one complete system from an adjacent system.

In Fig. 8 I have shown a protective system installed in the hull of a vessel 134 below the waterline in a compartment designated generally at 149. This built-in compartment within the hull of the vessel 134 is divided into two sections 150 and 151. In section 150 I arrange the transmitter as heretofore described and in section 151 I arrange the receiving system heretofore described. The transmitter includes the radiating elements 64 arranged adjacent the reflector 70 while the compartment 151 includes the receiving loops 5 and 7 connected with the receiving apparatus and suitably screened one with respect to the other by means of screen designated at S. The torpedo release mechanism which is controlled by the coaction of the transmitting and receiving apparatus is designated generally at 145. The compartment 149 in the hull of the vessel is closed by a plastic wall 149A of a character to withstand the heavy pressures to which the hull is subjected but through which the ultra-high frequency energy is readily transmitted in a path toward the objective and in the path reflected from the objective. The plastic wall material is known in the trade as "Plexiglas" and is similar to the substance used in the gunner's station in the nose of a bomber. The location of the transmitting and receiving apparatus below the waterline represents great precision in operation of the system of my invention as the radio waves are confined wholly to paths in the water and thus do not have to travel a composite path both through the ether and the water, which composite path because of differences in density may subject the waves to refraction or bending for introducing erriors in the system.

Figure 9:
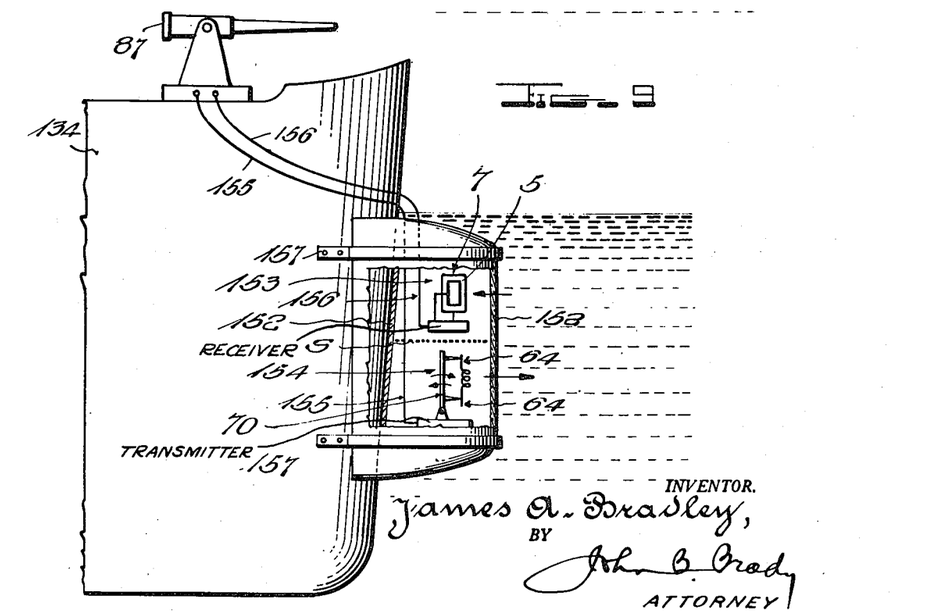
Fig. 9 is a schematic view showing the apparatus of my invention arranged in a housing attachable to the exterior of the hull of a vessel and below the waterline thereof.

In Fig. 9 I have shown means for obtaining results comparable to those described in Fig. 8 but which do not require modification of the hull structure. In this instance a portable housing or container having an open front wall of Plexiglas or other plastic is provided as represented at 152. The Plexiglas wall allows for the passage of ultra-high frequency waves into the container. The container is divided into two sections 153 and 154. Section 154 houses the transmitter represented at 64 coacting with the reflector 70. The other section 153 houses the receiving system including loops 5 and 7. Power and activating cables 155 extend from the transmitter section to the deck of the vessel 134 while activating cables 156 extend from the receiving apparatus to the ordnance equipment which may be carried by the deck of the vessel as represented at 87. The circuits and mechanism involved are as set forth in Figs. 1 and 2 in detail. Screen S is provided between the sections 153 and 154 of the housing 152 for preventing direct interference between the transmitter and the receiver and insuring activation of the receiver only by reflected energy emanating from the transmitter. Suitable braces 157 are provided for holding the Plexiglas compartment with respect to the external under-water portion of the hull 134. Thus the system of protection of my invention may be applied quickly to existing ship structures without modification of the vessel in any way.

In Fig. 10 I have shown the system of my invention applied to a torpedo indicated at 135 which after discharge from the torpedo tube 138 described in Fig. 6 is guided toward its objective under radio control by means of a radio system carried within the nose of the torpedo. The torpedo is provided with a nose structure 158 of the Plexiglas or other material through which high frequency waves freely pass. Within this nose 158 I arrange the transmitter represented at 64 with suitable reflector 70 and the receiving system comprising loops 5 and 7 associated with the receiving apparatus 3—4. A screen S is provided to prevent direct interference between the transmitter and the receiver. Energy is emitted from transmitter 64 along path 159 striking objective 136 and being reflected therefrom along path 160 for activating the loop system 5—7. The circuits of receiving system 3—4 control the angularly movable mechanism of the type illustrated in Figs. 1, 6 and 16, 17 and 18 except that in lieu of the angular control of the radio antenna of Fig. 16, the gun of Fig. 17 or the searchlight of Fig. 18, the receiving system controls the position of a rudder member 161 which serves to guide the torpedo toward the objective. The torpedo instead of being lost by possibility of missing the objective is thus guided directly into the objective for the destruction of the objective. The rudder 161 is attached to the ring member 39 through arms 162 which extend rearwardly from ring member 39 within the torpedo. The angular position of rudder 161 is thus controlled in the same manner that the ultra-high frequency beam of Fig. 16, the gun of Fig. 17 or the searchlight of Fig. 18 is controlled.

Figure 11:
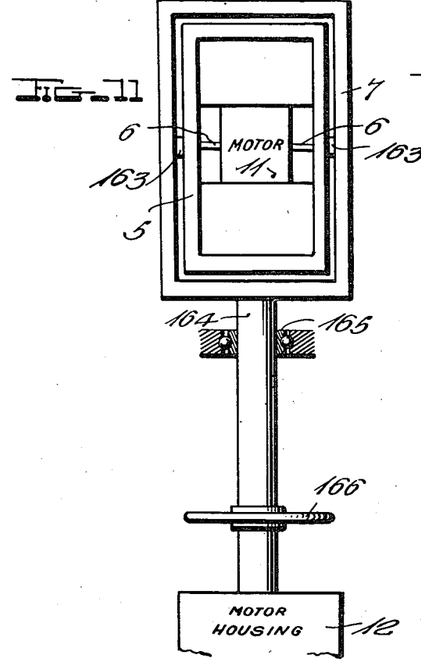
Fig. 11 illustrates one arrangement of receiving antennae at the receiving station for collecting the horizontal and vertical components of the energy reflected from the remote body.
Figure 12:
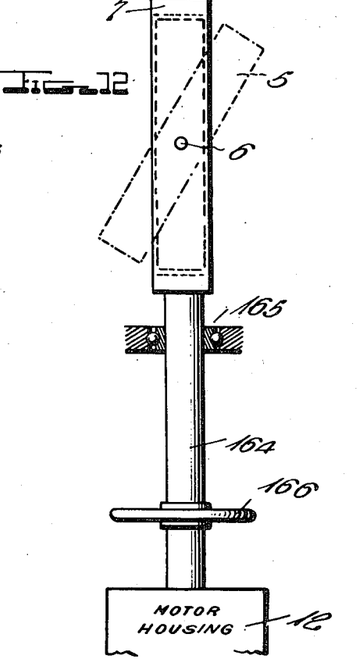
Fig. 12 is a side elevation of the receiving antennae illustrated in Fig. 11 showing the manner of independent control of the receiving antennae for the horizontal and vertical components.

In Fig. 11 I have shown one method of mounting the horizontal component loop 5 and the vertical component loop 7. The driving motor for the horizontal loop 5 is arranged within the housing designated at 11 while the driving motor of the vertically arranged loop 7 is arranged within housing 12. The loop 5 is carried by a shaft member 6 which is journalled within the frame which carries the loop member 7 as represented at 163. The frame which carries loop 7 is mounted upon an angularly adjustable shaft 164 which is journalled in suitable bearing 165 and connected with the driving motor within motor housing 12. Manual adjustment or setting of the loop structures may be effected through hand wheel 166.

Figure 13:
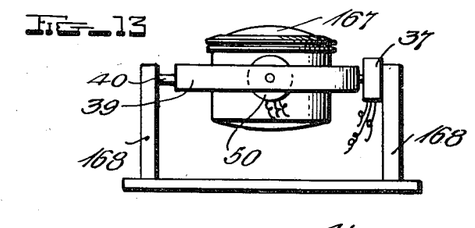
Fig. 13 is a side elevational view of a searchlight mechanism which is orientable on axes normal to each other for controlling a beam of light as distinguished from a beam of electrical energy as provided in the arrangement of Figs. 1–2.
Figure 14:
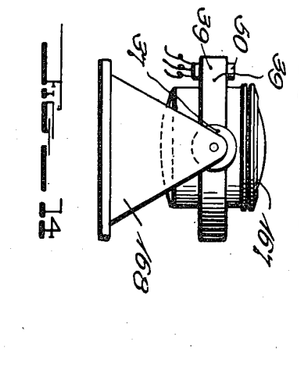
Fig. 14 is a side elevational view of the searchlight control mechanism illustrated in Fig.
Figure 15:
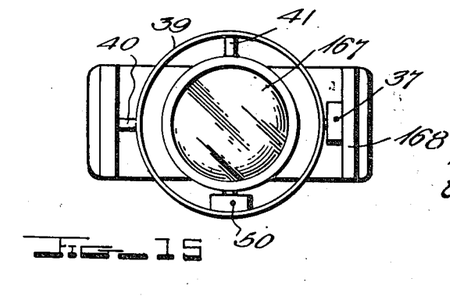
Fig. 15 is a plan view of the searchlight control mechanism.

In Figs. 13, 14 and 15 I have shown one manner of mounting the searchlight 167 for angular movement in planes normal to each other. The searchlight 167 is supported within ring member 39 by journalling means such as shaft 41 and controlled at angular movement by "Selsyn" motor and associated gear system, all of which I have represented as contained within casing 50 supported by a ring member 39. The angular position of ring member 39 is controlled by the "Selsyn" motor system which I have indicated as contained within casing 37 supported by suitable standards 168. The standards 168 serve as journalling means for journal 40 by which ring member 39 is pivotally suspended. Thus the searchlight 167 may be shifted in two planes normal to each other for following a mobile body automatically under control of energy reflected by that body and received by the receiving system explained more fully in Figs. 1 and 2.

Figure 19:
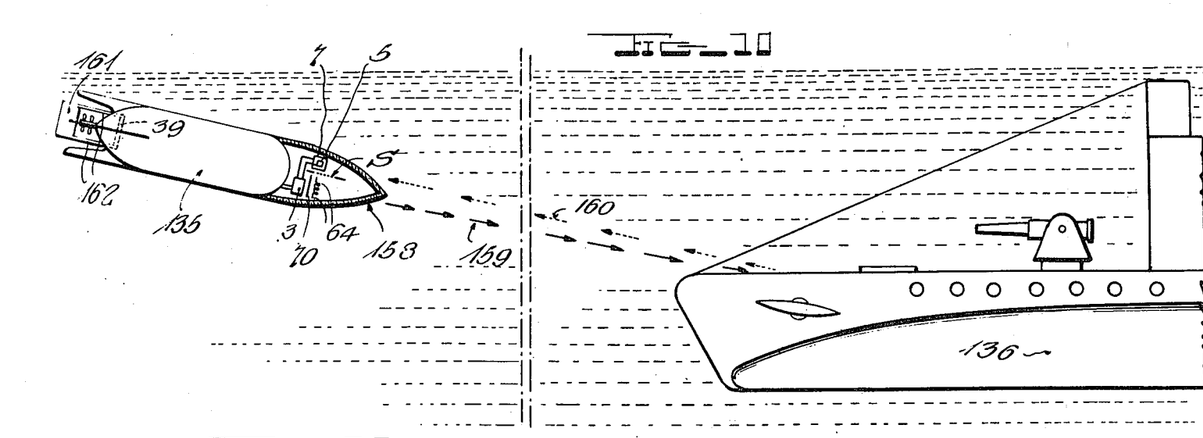
Fig. 19 schematically and diagrammatically illustrates the application of the principles of my invention to the determination of distance of remote bodies from a predetermined position embodying the principles of my invention.

In Fig. 19 I have shown a system by which altitude of approaching aircraft may be determined using a multiplicity of locator stations in geographically separated positions represented at 170, 171 and 172. The stations each include the receiving equipment, pretuned to different frequencies within the frequency range of the transmitter, comprising vertically adjustable loops 7 and horizontally adjustable loops 5 of the self-orienting type for aiming and firing the associated destructive weapons 87 upon receipt of energy reflected from the transmitting station represented generally at 173. The transmitting station 173 is similar in arrangement to the transmitting equipment illustrated in Figs. 2 and 16 including means for periodically sweeping a wide geographical area to be protected at the same time that the frequency of the transmitter sweeps a relatively wide band. The beam of ultra-high frequency energy may be intercepted by any one of the approaching aircraft that I have represented at 174, 175 and 176. As the ultra-high frequency beam is shifted angularly from positions 177, 178 and 179, the intervening bodies represented by the approaching aircraft cause reflection of the energy along the lines indicated at 180, 181, 182 activating the sets of loops 5—7 at the locator stations 170, 171 and 172, etc. The mechanism at the locator stations is as set forth in Figs. 1 and 2, the destructive weapons 87 being oriented, aimed and fired to direct a destructive force along lines 183, 184 or 185 aligned sufficiently in advance of the estimated position of the aircraft to effect a hit for the destruction of the aircraft.

The receiving circuits at the locator stations in addition to the relay control systems set forth more fully in Fig. 1, also include monitoring circuits which I have indicated at 186, 187 and 188, each containing a relay operating winding shown at 189, 190 and 191. The individual relay windings operate separate relay armature members represented at 192, 193 and 194. These armature members control movable contactors which establish connection with sets of fixed contacts. That is to say, the contactor controlled by armature 192 closes relay contacts 195, 196 and 197 when in its operated position. The circuit through armature 192 includes a source of audio frequency current designated at 198 which is connected through a land line 199 to the reed operating winding 200 of a frequency indicator 201 located at the geographically separated transmitting station 173. The frequency indicator contains a multiplicity of vibratory reeds represented at 202, 203 and 204 located in spaced positions along a scale 205. These reeds each vibrate selectively at different audio frequencies depending upon the existence or non-existence of an exciting current in operating windings 200, 206 or 207, etc. An individual operating winding and associated reed is provided for each remote station so that it is possible by observing the scale 205 to determine which locator station is activated by reflected energy. Fig. 19 as shown schematically represents locator station 170 activated by the reflected energy so that operating winding 200 is energized through the circuit completed from audio frequency source 198 through contactor 192, contact 197 and activating winding 200 through the remote line circuit 208 and returning through the remote lines 199. Movement of the contactor under control of armature 192 also closes contacts 195 and 196 closing the circuit through solenoid 82 and source of power 209 whereupon relay armature 210 is angularly shifted to open the circuit from the power source 211 to the motors 69 and 73 thereby arresting both the frequency shift control for the transmitter and the beam sweeping mechanism for the transmitter.

The other remote locator stations are similarly arranged. In the case of station 171 the relay armature 193 controls a contactor arranged to close circuits through contacts 212, 214 and 215. The closing of contactor 212 completes a circuit through audio frequency source 216 and a remote control line 217 to activating winding 206 of the frequency indicator 201, the circuit being completed through line 218 for thereby giving an indication through reed 203 of the receipt of reflected energy from aircraft 175 at the instant that the transmitter is radiating a beam of energy in the direction 178.

Similarly a condition of reflected energy at locator station 172 may be observed when relay 191 is activated, moving the armature which shifts contactor 194 into circuit closing position with respect to contacts 219, 220 and 221. A circuit path is completed through audio frequency source 224, contactor 194, contact 219, remote control line 222, activating winding 207 of frequency indicator 201 and remote control line 223 back to the audio frequency source 224. Thus reed 204 is set into vibration indicating the receipt of reflected energy at locator station 172. Pairs of contacts 220 and 221 are closed by contactor 194 for energizing solenoid 82 and opening the circuit to driving motors 69 and 73 for arresting the operation of the transmitter. The audio frequency sources 198, 216 and 224 have frequencies $f$, $f_1$ and $f_2$, etc., which indeepndently register on the frequency indicator 201 for designating the locator stations at which reflected energy is being received.

Relay 82 is a slow release relay with slug 227 thereon so that after the locator stations are no longer subject to receipt of reflected energy, solenoid 82 is deenergized and spring 228 again closes the circuit to motors 69 and 73 from source 211 whereupon the transmitting station 173 again becomes active both in the shifting of the beam and changing of the frequency thereof. Solenoid 82 in Fig. 19 accordingly differs from the correspondingly numbered relay in Figs. 1-2 in that the delayed action for the release mechanism 82 in Figs. 1-2 is secured by the slow release arrangements of relays 85 and 86, whereas in Fig. 19 the delayed action is secured by imparting slow release properties to relay 82.

Each of the locator stations include provision for shielding the loops 5 and 7 from direct reception of signalling energy as represented at S, $S_1$ and $S_2$.

The scale 205 of the frequency indicator 201 is immediately associated with a semi-circular dial structure 229 calibrated in degrees and over which indicator arm 225 is angularly movable under control of shaft structure 226 which connects with angularly shiftable reflector 70 pivotally mounted at 72. As the reflector 70 is angularly shifted for swinging the beam of ultra-high frequency energy in a wide path, the indicator arm 225 follows a corresponding path of movement with respect to the calibrated scale 229. Accordingly, it is possible to read the angle at which the ultra-high frequency beam is propagated by directly observing the position of indicator 225 with respect to scale 229. The distance from each locator station 170, 171, 172, etc., to the transmitting station 173 and more particularly to the exact center line of the reed indicators in the frequency indicator 201 is known and fixed. I have indicated the distance between reed 202 and locator station 170 by the distance $\beta$. The distance between reed 203 and locator station 171 is indicated by the distance $\beta_1$. The distance between the reed 204 and the locator station 172 is indicated by the distance $\beta_2$. Accordingly, when any of the locator stations are activated by reflected energy, the angle of propagation and correspondingly the angle of incidence can be directly read from scale 229 and the distance $\beta$ is immediately known. As represented in Fig. 20, substitutions and solutions for the altitude A may be immediately made by the relation:

$$A = \tan \alpha . \tfrac{1}{2}$$

Other trigonometric functions can also be determined inasmuch as the angle is directly observable and the length of the side adjacent the angle is known.

In order to insure the precision operation of the system of my invention, I may provide means for controlling the propagation of energy from the transmitter only to that altitude required under particular weather conditions. That is, under conditions of heavy static, more power is necessary for propagation than would be the case under conditions of fair weather. Various methods may be employed to control the radiation output of the transmitter in accordance with weather conditions. In Fig. 21 I have shown the transmitter 229 coupled to the tuned output circuit 66—68 through a radio frequency amplifier stage represented generally at 230 for impressing ultrahigh frequency energy upon the radiating element 64. The grid circuit of tube 231 may be provided with suitable bias potential from direct current generator 232 which is regulated through rheostat 233. An aneroid cell 234 is arranged to vary the effective resistance of rheostat 233 for controlling the bias potential on the grid of tube 231 for thereby controlling the transfer of energy to the radiation element 64. The aneroid cell changes its physical characteristics in accordance with barometric pressure for correspondingly changing the setting of rheostat 233. It will be understood that instead of changing the condition of bias the aneroid cell may change the amplitude of the current supplied to the radiation circuit and correspondingly control the propagation of energy into space according to conditions of the weather.

My invention contemplates the mounting of the antiaircraft guns or destructive weapons 87 in such arrangement that compensating torsional springs are imposed between the gun and the gun mount on table 42 so that kickback or throw-off of the gun from the discharge thereof is absorbed.

It will be understood that the rhythmical waving of the transmitter beam is only arrested for a predetermined time period after the initial reflection of energy by the intervening body. The purpose of arresting the movement of the beam by the relay control circuit 85—86 is to effectively destroy waves of attacking aircraft which may follow the initial aircraft which triggers off the arresting means. The time delay means 85a and 86a in Figs. 1 and 2 and 227 in Fig. 19 become ineffective after a predetermined time interval and restore the transmission system to the original condition of rhythmic waving and change in frequency.

It will be understood that any suitable triggering device may be employed as part of the fire control mechanism 88 embodied in the circuits of Figs. 1-2 and in all of the arrangements embodying the automatic actuation of the destructive weapon. A solenoid operated by the fire control mechanism indicated generally at 88 effects the operation of the firing pin of the aircraft gun 87. Various forms of firing mechanisms may be employed and as one example of automatic firing device, reference is made to Patent 1,288,386 of December 17, 1918, to Fernon Conill which may be employed in the system of my invention.

Although my invention has been described with some particularity in connection with destructive weapons, it will be understood that my invention has many peacetime applications in the navigation of aircraft for Civil Aeronautics Administration operation where it is important to have accurate knowledge of the location of aircraft flying on various schedules. Many other applications of my invention will occur to those skilled in the art from the description I have given herein.

Figures 22, 23, 24, 26, 27:
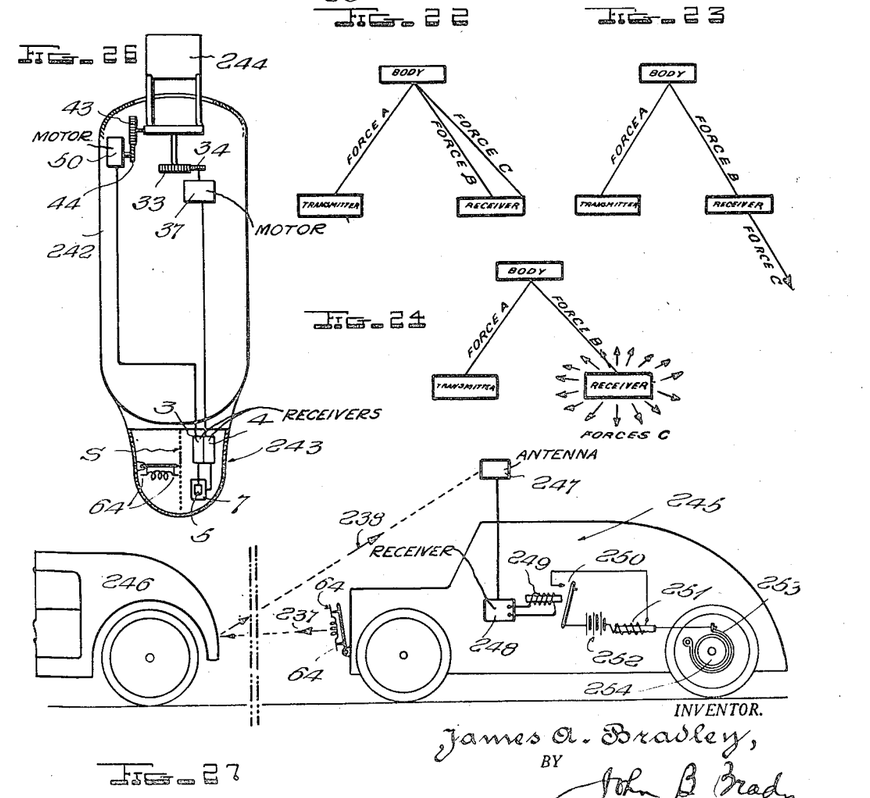
Fig. 22 is a theoretical diagram explaining the principles of my invention.
Fig. 23 is a further theoretical diagram explaining other principles of my invention.
Fig. 24 is a theoretical diagram showing other principles of my invention.
Fig. 26 is a schematic view showing my invention applied to the guiding of an aircraft bomb to an objective.
Fig. 27 illustrates my invention applied to the protection of mobile bodies such as automobiles, trains and other moving bodies for automatically preventing collision and accidents.
Figure 25:
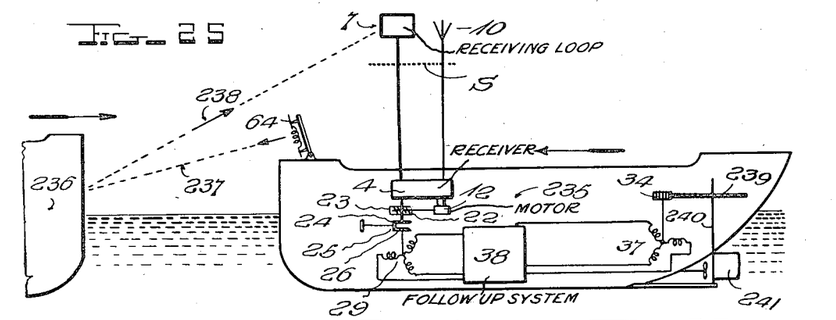
Fig. 25 is a schematic view showing the application of my invention to the protection of vessels for prevention of collision in normal peacetime operation.

By way of example, I have illustrated schematically certain of the applications of my invention in Figs. 25, 26 and 27. I have schematically illustrated the principles embodied in my invention in Figs. 22, 23 and 24. Fig. 22 brings out clearly the development of a force A by the transmitter which strikes the intervening body producing a reflected force B. The reflected force B is received by the receiver and relays the force C which is directed toward the body. These principles were well set forth in my Patent No. 2,399,426. In Fig. 23 however, I show schematically the further advantages embodied in the system of my invention by which force C is directed in some other direction than toward the body from which force B was developed. In Fig. 24 I have shown the manner in which the transmitter in developing force A that strikes the body forces a reflected force B directed toward the receiver which in turn releases a multiplicity of forces C which may disseminate in many directions. These principles are applicable for many purposes as illustrated, for example, in Figs. 25, 26 and 27.

In Fig. 25 the vessel 235 is shown equipped with rudder control equipment for automatically averting collision with another vessel 236. The apparatus employed is similar to one channel of the equipment described in Fig. 1 in which energy directed in a beam from transmitter 64 follows the course shown at 237 striking the object 236 and being returned along in the direction 238 where the energy activates loop 7 associated with receiver 4 and antenna 10. The loop 7 is automatically orientable by driving motor 12 through worm and gear combination 22—23 for driving through the corrective gear system 24, 25 and 26 the "Selsyn" generator 29. Energy is imparted by "Selsyn" generator 29 through synchronous follow-up system 38 to "Selsyn" motor 37 which drives gear 34 in a manner similar to that described in connection with Fig. 1. Gear 34 meshes with gear 239 carried by rudder control shaft 240. Rudder 241 is controlled through suitable mechanism by shaft 240 for directing rudder 241 in such direction as will enable vessel 235 to escape collision with object 236. The circuits of the receiving system are regulated to respond at an amplitude precalibrated as to distance between the vessel 235 and object 236. Direct influence of the transmitter 64 upon the receiving system is prevented by a suitable shield S.

My invention is also applicable in the guiding of other objects such as the aerial bomb 242 shown in Fig. 26. The aerial bomb 242 is equipped with apparatus similar to that illustrated in Fig. 10 for guiding the aerial bomb to a destination comprising a metallic body. The radio control apparatus is housed within the nose 243 of the bomb and comprises the equipment described in Figs. 1 and 2 except that it is unnecessary in this application to utilize the frequency change provision at the transmitter described in Fig. 2. The equipment in the nose 243 of the bomb 242 includes transmitter 64 separated by shield S from the loop system 7—5 connected with the receiver system 3—4 connected through circuits as illustrated in Figs. 1-2 to control mechanism constituted by "Selsyn" motors 37 and 50 for driving gear systems 34—33 and 44—43, respectively, for orienting the guide vane 244 through mechanism similar to that described in connection with Figs. 16, 17 and 18.

Fig. 26 is representative of a large number of applications of my invention including propelled mines and parachute equipment. A parachutist equipped with a guiding apparatus similar to that represented by Fig. 26 may maneuver parachute toward a particular objective such as the metallic structure of a fortress in attacking the objective for landing under cover of darkness. Such an arrangement enables paratroopers to more accurately descend toward a concentrated spot. The mechanism provides in effect a pulling or attractive force to direct the paratrooper to a particular location inasmuch as the paratrooper will be guided toward a metallic structure.

In Fig. 27 I have represented an application of my invention for the prevention of collision of automobiles, trains or other moving bodies as represented by vehicle 245. The objective or vehicle with which collision is to be avoided is shown at 246. Transmitter 64 on vehicle 245 transmits ray 237 as in Fig. 25 which is reflected along path 238 as in Fig. 25 for activating receiving antenna which in this instance may be of simplified form designated generally at 247. The receiving antenna connects with radio receiver 248, the output of which includes relay 249 having contact 250 arranged in a local control circuit to an electromagnetic braking system represented at 251 suitably energized from source 252. The electromagnetic braking system applies a third force to the brake system 253 of a brake drum 254 for slowing vehicle 245 for preventing collision with obstruction 246. The receiver 248 is precalibrated to activate relay 249 upon rise in signal amplitude beyond a predetermined level.

It will be understood that the principles I have described herein are applicable generally to a seabody repulsing or avoiding a seabody, an airbody repulsing or avoiding an airbody, a landbody repulsing or avoiding a landbody, or an underseabody repulsing or avoiding an underseabody, or any of these avoiding or repulsing any of the other bodies or any other objects.

While I have described my invention in certain of its preferred embodiments, I realize that various modifications may be made and I intend no limitations upon my invention other than may be imposed by the scope of the appended claims.

What I claim as new and desire to secure by Letters Patent of the United States is as follows:

1. A remote detection and control system comprising a transmitter an emitter connected to said transmitter for emitting high frequency energy in an angularly displaceable beam, means for orienting said emitter a receiving system comprising vertically and horizontally orientable loop systems, a device angularly shiftable along both vertical and horizontal axes in proportion to the movement of said orientable loop systems and means controlled by said device for operating the aforementioned means whereby an intervening body in the path of the emitted high frequency energy effects a reflection of energy to said receiving system for controlling an emission of energy by said device in the direction of said intervening body.

2. In a remote detection and control system, a transmitting station including means for emitting a beam of energy in space, a receiving station having both vertically and horizontally disposed means for receiving energy reflected by an intervening body in space from said transmitter, another energy transmitter movable about vertical and horizontal axes for directing energy toward the intervening body, means operated by said vertically and horizontally disposed energy receiving means for controlling the angular movement of said last mentioned energy transmitter and means controlled by energy received by both said vertically and horizontally disposed means for activating said last mentioned energy transmitter.

3. A remote detection and control system comprising an energy transmitting station for projecting energy in a beam, a receiving station including vertically and horizontally arranged devices for receiving energy reflected by an intervening body intercepting the path of the projected beam, means for directing a projectile toward the intervening body, fire control mechanism associated with said means, and a series circuit leading to said fire control mechanism and having contactors disposed therein, one of said contactors being controlled by energy received by said vertically arranged device and the other of said contactors being controlled by energy received by said horizontally arranged device for operating said fire control when both of said devices are activated.

4. A remote detection and control system comprising an energy transmitting station for projecting energy in a beam, a receiving station including vertically and horizontally arranged devices for receiving energy reflected by an intervening body intercepting the path of the projected beam, means for directing a projectile toward the intervening body, fire control mechanism associated with said means, a series circuit leading to said fire control mechanism and having contactors disposed therein, one of said contactors being controlled by energy received by said vertically arranged device and the other of said contactors being controlled by energy received by said horizontally arranged device for operating said fire control when both of said devices are activated, and means for maintaining said contactors closed for a predetermined time period after the initial activation of said devices for maintaining said fire control mechanism in operation over a predetermined time period.

5. A remote detection and control system comprising means for transmitting a beam of ultra-high frequency energy, means for varying the frequency of the emitted ultra-high frequency energy, means for controlling the angle of movement of the beam of ultra-high frequency energy abouth both vertical and horizontal axes, a receiving system including vertically and horizontally self-orientable signal receiving structures arranged to receive energy reflected by a body intervening in the path of the transmitted beam, means controlled by the self-orientable signal receiving structures for controlling said first mentioned means, and means operative upon receipt of energy reflected by the intervening body for arresting the operation of the frequency varying means for a predetermined time period.

6. A remote detection and control system comprising a transmitter for emitting high frequency energy in an angularly displaceable beam, a receiving system comprising vertically and horizontally orientable receiving devices, signal receiving apparatus individual to each of said receiving devices and forming separate receiving channels, a dual telephone circuit having one telephone connected to one receiving channel and the other telephone connected to the other receiving channel for simultaneously observing the operation of each signal receiving apparatus, means for propagating energy into the area into which said high frequency energy is emitted, means controlled by said receiving apparatus for orienting, aiming and activating said last mentioned means in accordance with the position of an intervening body intercepting said emitted high frequency energy and reflecting such energy to said receiving devices.

7. A remote detection and control system comprising a transmitter for emitting energy in an angularly displaceable beam, a receiving system comprising vertically and horizontally orientable energy receiving elements automatically adjustable in position according to the direction of the received energy, a gun, means for mounting the gun for vertical and horizontal positional adjustment, fire control mechanism for the gun, means controlled by said energy receiving elements for controlling the positional adjustment of the gun, and means operated by said receiving system for actuating said fire control mechanism according to the time of interception of the transmitted energy by an intervening body and the reflection of the energy to said receiving system.

JAMES ALBERT BRADLEY.

REFERENCES CITED

The following references are of record in the file of this patent:

UNITED STATES PATENTS

| Number | Name | Date |
|---|---|---|
| 1,892,431 | Hammond | Dec. 27, 1932 |
| 2,176,469 | Moueix | Oct. 17, 1939 |
| 2,216,575 | Seinfeld | Oct. 1, 1940 |
| 2,231,929 | Lyman | Feb. 18, 1941 |
| 2,256,787 | Lazar | Sept. 23, 1941 |
| 2,304,446 | Eaton | Dec. 8, 1942 |
| 2,409,448 | Rost et al. | Oct. 15, 1946 |
| 2,409,462 | Zworykin et al. | Oct. 15, 1946 |

FOREIGN PATENTS

| Number | Country | Date |
|---|---|---|
| 455,765 | Great Britain | Oct. 27, 1936 |
| 546,488 | Great Britain | July 16, 1942 |